W. H. ABEL,

Assignor to S. HODGSON.

Method of Manufacturing Knit Mittens.

No. 9,767. Reissued June 21, 1881.

Witnesses,
F. L. Ourand
H. Aubrey Coutnin

Inventor
Wm. H. Abel.
by John J. Halsted
his atty.

N. PETERS, Photo-Lithographer, Washington, D. C.

UNITED STATES PATENT OFFICE.

WILLIAM H. ABEL, OF BRIDGEWATER, ASSIGNOR TO SAMUEL HODGSON, OF MEREDITH, NEW HAMPSHIRE.

METHOD OF MANUFACTURING KNIT MITTENS.

SPECIFICATION forming part of Reissued Letters Patent No. 9,767, dated June 21, 1881.

Original No. 177,086, dated May 9, 1876. Application for reissue filed May 10, 1881.

*To all whom it may concern:*

Be it known that I, WILLIAM HENRY ABEL, of Bridgewater, in the county of Grafton and State of New Hampshire, formerly of Bristol, in said county, have invented an Improved Method of Manufacturing Knit Mittens; and I do hereby declare that the following is a full and exact description thereof, reference being had to the accompanying drawings, making part of this specification.

Figure 1:
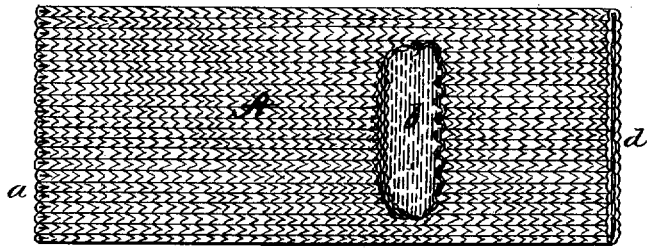
Figure 2:
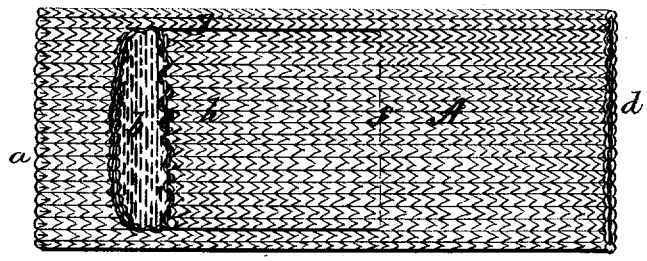
Figure 3:
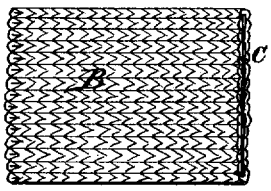
Figure 4:
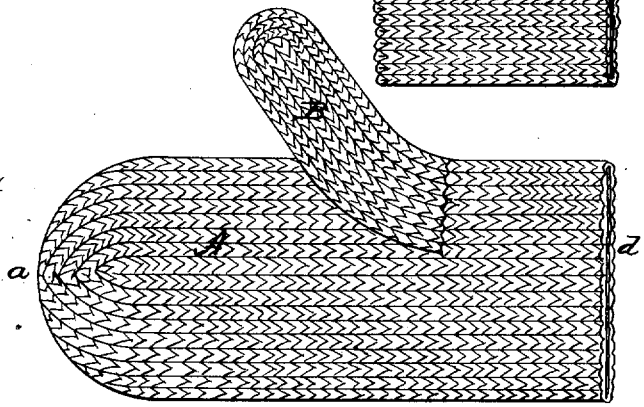

Figure 1 is a view of the body of the mitten, cut for the reception of a strip to form the thumb thereof; Fig. 2, a similar view of a mitten-body cut in a manner somewhat different from that shown in Fig. 1; Fig. 3, a view of the thumb-piece before it is inserted in the body of the mitten; Fig. 4, a view of the mitten after the thumb-piece is inserted.

Like letters designate corresponding parts in all the figures.

My invention consists in the method of forming mittens from a piece or section of tubular-knit web, the thumb being made from a separate strip of knit web and inserted in an incision in the side of such tubular piece, and the tip of the mitten being closed up by crocheting or sewing.

The body of the mitten is knit in a tubular web and cut therefrom to the proper length, and the end *a* thereof is narrowed or shaped by cutting and closed by crocheting or sewing in any suitable manner. For the insertion or attachment of the thumb I make a cross-cut, *b*, Fig. 1, in the body of the mitten, in the proper position for the base of the thumb, this cut being as long as required to admit the proper size of thumb. The thumb itself is formed from a separate knit piece, B, Fig. 3, of the requisite width to form the circumference of the thumb, and of a length equal to the required length of the thumb. One end, *c*, of this strip is then crocheted or sewed to the upper one of the two edges of the cross-cut *b* in the body of the mitten, and a portion of the adjacent side edges thereof is in like manner joined to the lower of the said cross-cut edges, while the remainder of the side edges are joined together, the outer end of the thumb being shaped by rounding off the corners at the outer end of the thumb-piece. The mitten then, when provided with a suitable binding or border, *d*, at the upper or wrist end, is finished, as shown in Fig. 4.

By the modification shown in Fig. 2 the cross-cut *b* is made nearer the tip or lower end of the mitten a distance equal to the length of the thumb from the line *f*, where the base of the thumb is to be. Then from the cross-cut the mitten is cut lengthwise along the two lines *g g* to the base-line *f*, thus setting free a thumb-strip, *h*, already joined to the body of the mitten, and the space left by cutting out said thumb-strip is filled by crocheting or sewing in another piece; or the thumb-strip may be of one-half width and the inserted piece of double length, one half filling the space and the other half thereof forming one half of the thumb, and the said strip *h* forming the other half of the same.

This method or process of knitting mittens is exceedingly rapid and cheap, and produces a mitten as strong and good, substantially, as the hand-knit mitten.

What I claim as my invention, and desire to secure by Letters Patent, is—

The method of forming a knit mitten from a piece or section of tubular-knit fabric, by closing up the same at the tip by crocheting or sewing, and inserting the thumb portion in an incision made in the side of such piece or section.

WILLIAM HENRY ABEL.

Witnesses:
H. W. BOARDMAN,
F. W. REEVES.